(12) United States Patent
Ito

(10) Patent No.: US 9,906,708 B2
(45) Date of Patent: Feb. 27, 2018

(54) IMAGING APPARATUS, IMAGING METHOD, AND NON-TRANSITORY STORAGE MEDIUM STORING IMAGING PROGRAM FOR CONTROLLING AN AUTO-FOCUS SCAN DRIVE

(71) Applicant: Olympus Corporation, Shibuya-ku, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/013,665

(22) Filed: Feb. 2, 2016

(65) Prior Publication Data

US 2016/0234424 A1   Aug. 11, 2016

(30) Foreign Application Priority Data

Feb. 5, 2015 (JP) .................. 2015-021007

(51) Int. Cl.
*H04N 5/232* (2006.01)
*H04N 7/01* (2006.01)
(Continued)

(52) U.S. Cl.
CPC ....... *H04N 5/23212* (2013.01); *H04N 5/2351* (2013.01); *H04N 5/2353* (2013.01);
(Continued)

(58) Field of Classification Search
CPC .... H04N 5/144; H04N 5/147; H04N 5/23212; H04N 7/0127; H04N 5/23245; H04N 5/2351; H04N 5/2353; G06T 7/20
(Continued)

(56) References Cited

U.S. PATENT DOCUMENTS 7,620,311 B2 * 11/2009 Ito .................... G03B 13/36
348/345
9,578,231 B2 * 2/2017 Hamano ............ H04N 5/23212
(Continued)

FOREIGN PATENT DOCUMENTS

JP   2004-289870   10/2004

OTHER PUBLICATIONS

First Office Action to corresponding Chinese Patent Application No. 201610081007.X, dated Jun. 16, 2017 (6 pgs.), with translation (11 pgs.).

*Primary Examiner* — Ngoc-Yen Vu
(74) *Attorney, Agent, or Firm* — John C. Pokotylo; Pokotylo Patent Services

(57) ABSTRACT

An imaging apparatus moves a focus lens on the basis of an imaging signal of an image pickup device to perform a focal adjustment. The image pickup device images a subject. The imaging apparatus includes an evaluation value calculation circuit, a control circuit, and a movement determination circuit. The evaluation value calculation circuit extracts a predetermined signal component from an imaging signal to generate an evaluation value. The control circuit performs a focal adjustment on the basis of the evaluation value. The movement determination circuit determines whether or not the subject or the imaging apparatus is moving. The control circuit changes a frame rate of the image pickup device from a first frame rate to a second frame rate higher than the first frame rate when the movement determination circuit determines that the subject or the imaging apparatus is moving.

15 Claims, 15 Drawing Sheets

(51) Int. Cl.
*H04N 5/235* (2006.01)
*G03B 13/00* (2006.01)
*H04N 5/14* (2006.01)

(52) U.S. Cl.
CPC ....... *H04N 5/23245* (2013.01); *H04N 7/0127* (2013.01); *H04N 5/144* (2013.01)

(58) Field of Classification Search
USPC .......................... 348/155, 169, 208.1–208.2
See application file for complete search history.

(56) References Cited

U.S. PATENT DOCUMENTS

| | | | |
|---|---|---|---|
| 2011/0032419 A1* | 2/2011 | Sakaniwa | H04N 7/0132 348/452 |
| 2012/0176505 A1* | 7/2012 | Kim | H04N 5/23219 348/222.1 |
| 2014/0184879 A1* | 7/2014 | Kim | G03B 13/36 348/341 |
| 2016/0088219 A1* | 3/2016 | Matsumoto | H04N 5/23219 348/169 |

* cited by examiner

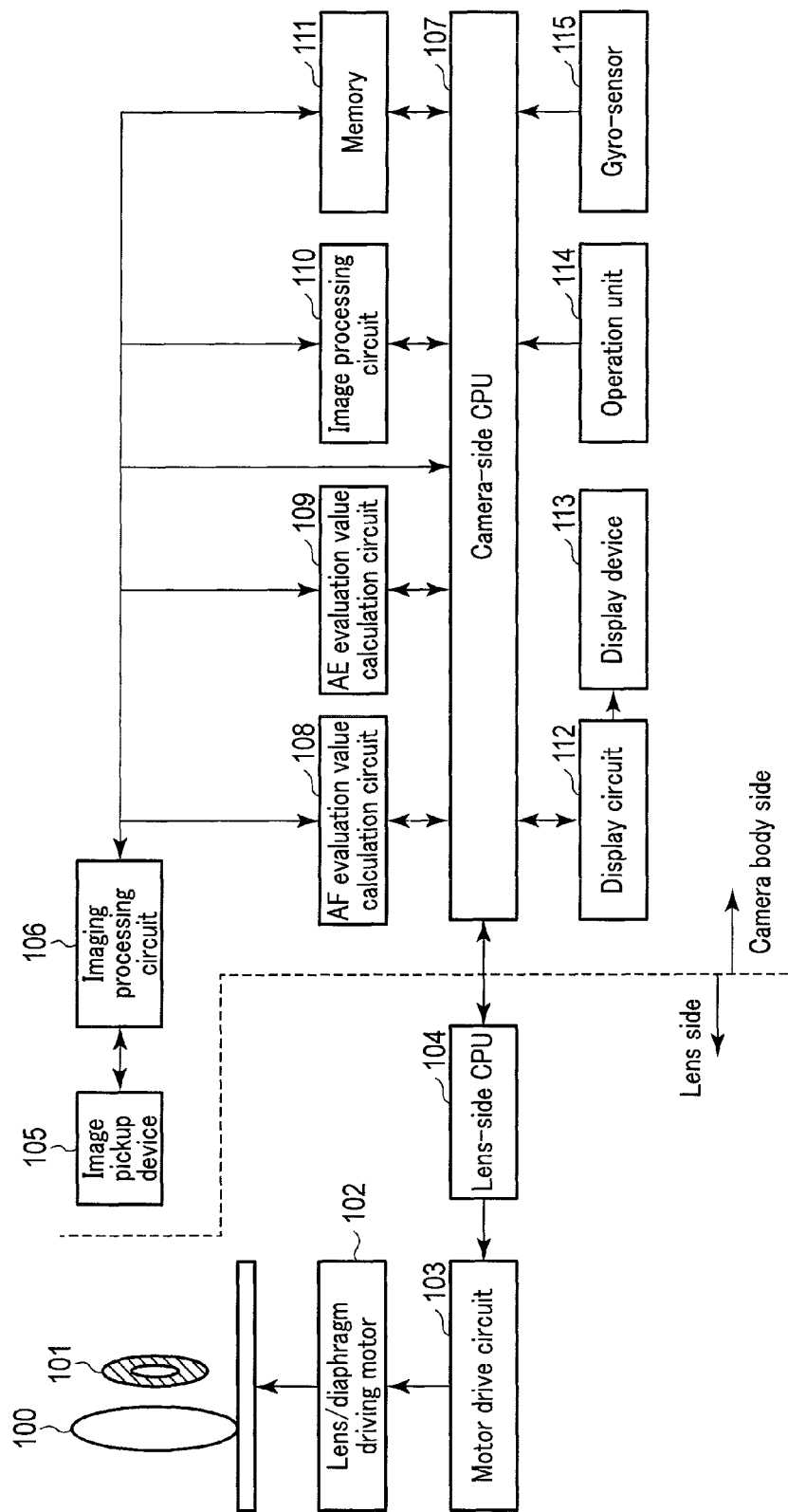
F I G. 1

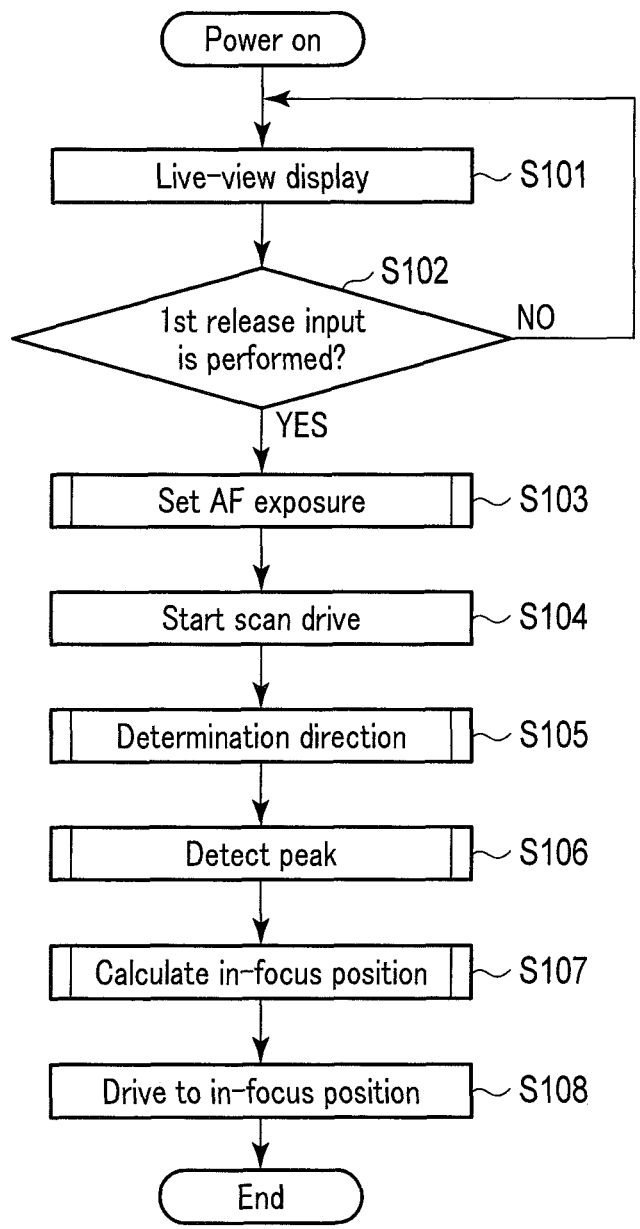
F I G. 2

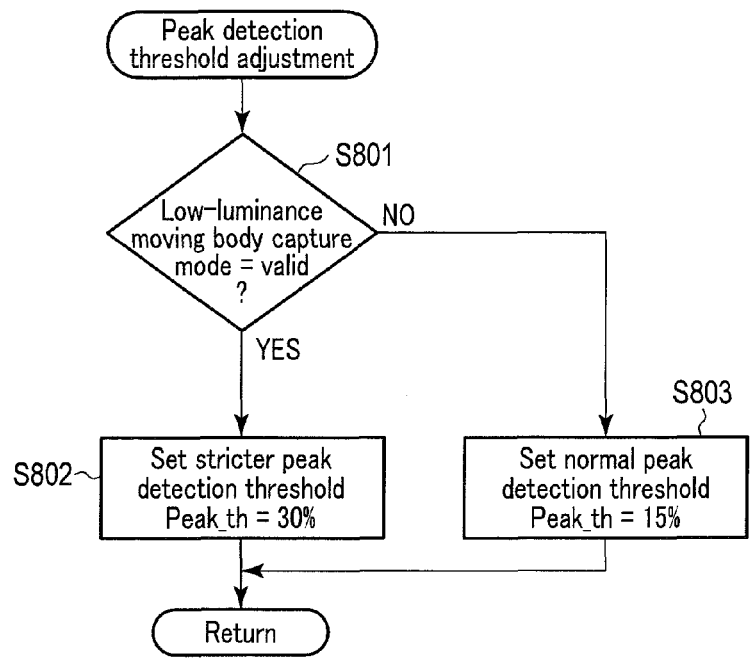
F I G. 10
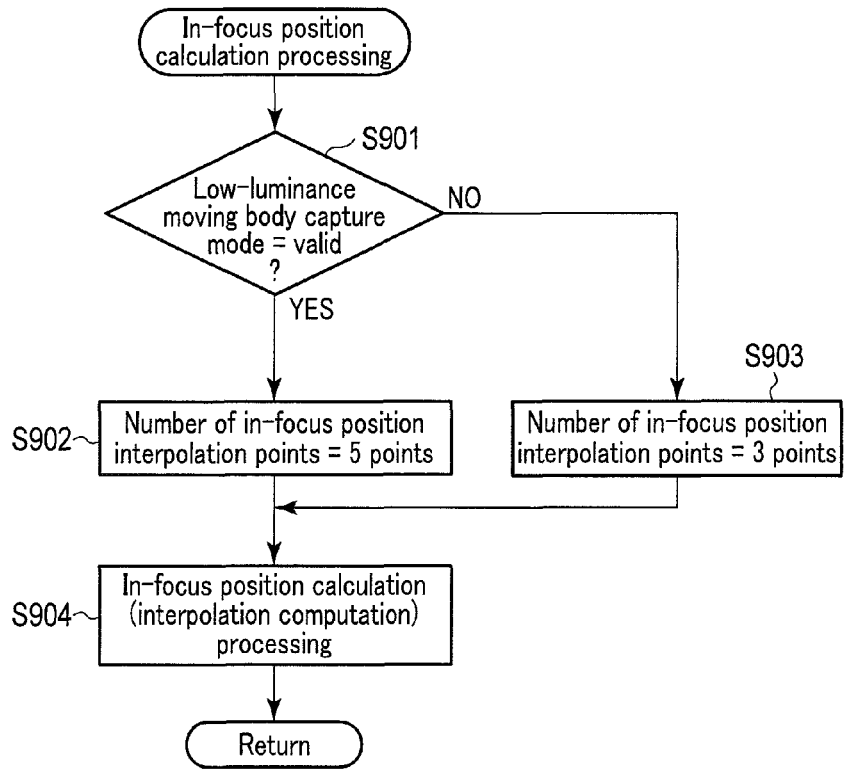
F I G. 11

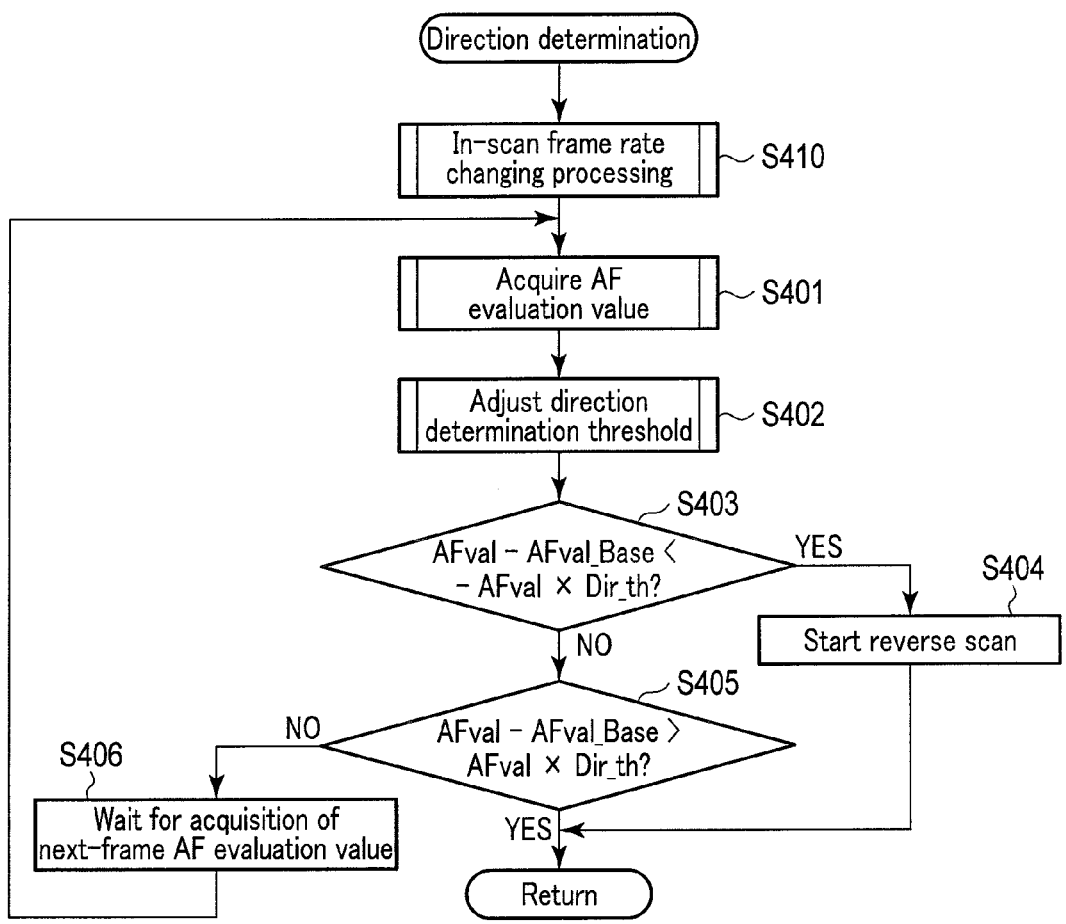
F I G. 14

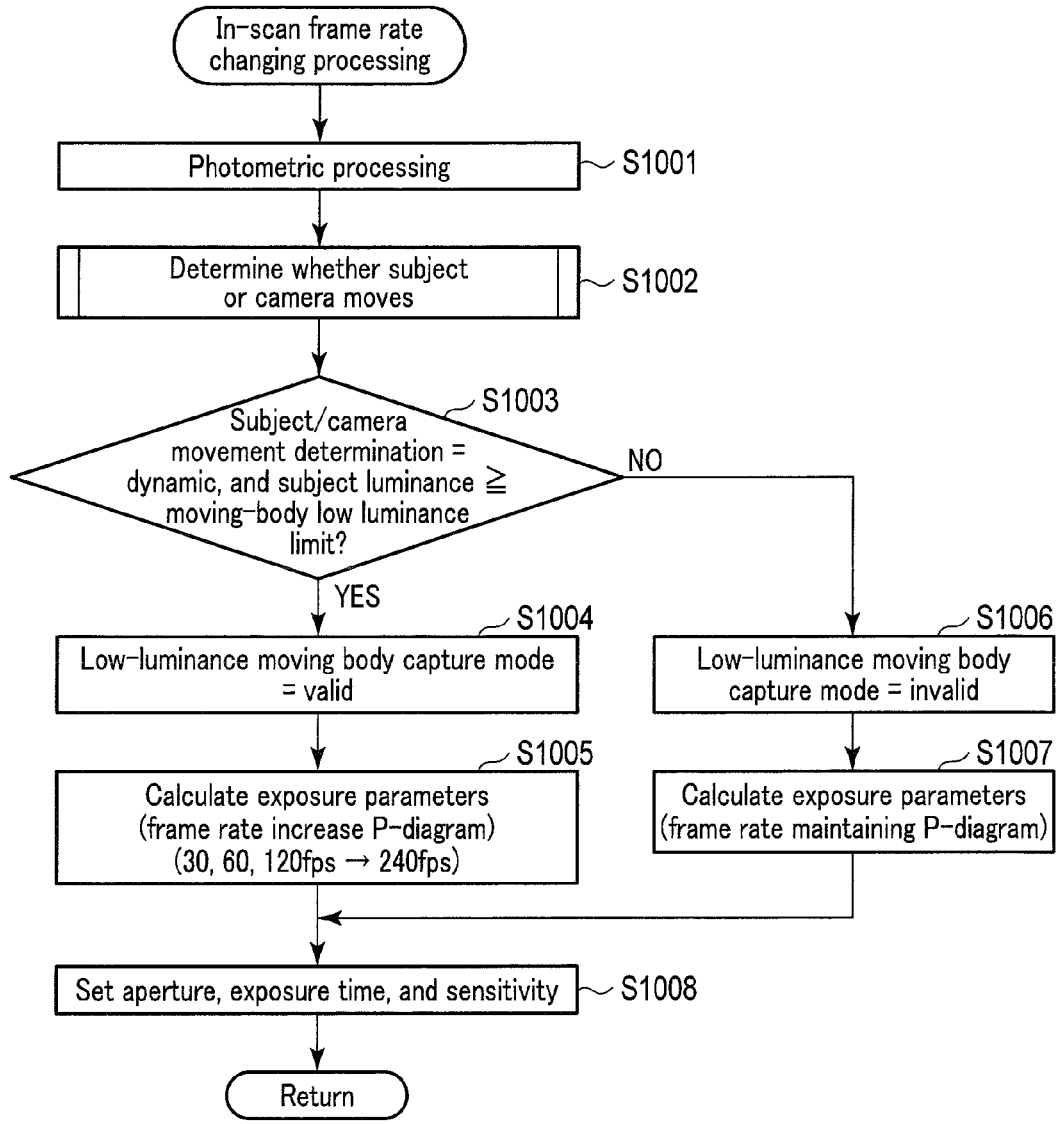
F I G. 16

IMAGING APPARATUS, IMAGING METHOD, AND NON-TRANSITORY STORAGE MEDIUM STORING IMAGING PROGRAM FOR CONTROLLING AN AUTO-FOCUS SCAN DRIVE

CROSS-REFERENCE TO RELATED APPLICATIONS

This application is based upon and claims the benefit of priority from the prior Japanese Patent Application No. 2015-021007, filed Feb. 5, 2015, the entire contents of which are incorporated herein by reference.

BACKGROUND OF THE INVENTION

1. Field of the Invention

The present invention relates to an imaging apparatus, an imaging method, and a non-transitory storage medium storing an imaging program.

2. Description of the Related Art

As one method of automatic focus detection (AF) for a photography lens provided in an imaging apparatus, a contrast AF method is used. The contrast AF method is a method which calculates an AF evaluation value indicating a contrast value of a subject image formed by the imaging lens and controls the position of a focus lens so that the AF evaluation value will be a peak value.

In general, according to the contrast AF method, the influence of noise on the AF evaluation value increases and focusing accuracy deteriorates at the time of AF for a low-luminance subject. Thus, for example, a digital camera suggested in Jpn. Pat. Appln. KOKAI Publication No. 2004-289870 decreases the frame rate of an image pickup device and thereby increases the exposure amount to inhibit the influence of noise on the AF evaluation value at the time of AF for a low-luminance subject.

BRIEF SUMMARY OF THE INVENTION

According to a first aspect of the invention, there is provided an imaging apparatus which moves a focus lens on the basis of an imaging signal of an image pickup device to perform a focal adjustment, the image pickup device imaging a subject, the imaging apparatus comprising: an evaluation value calculation circuit which extracts a predetermined signal component from the imaging signal to generate an evaluation value; a control circuit which performs the focal adjustment on the basis of the evaluation value; and a movement determination circuit which determines whether or not the subject or the imaging apparatus is moving, wherein the control circuit changes a frame rate of the image pickup device from a first frame rate to a second frame rate higher than the first frame rate when the movement determination circuit determines that the subject or the imaging apparatus is moving.

According to a second aspect of the invention, there is provided an imaging method by an imaging apparatus which moves a focus lens on the basis of an imaging signal of an image pickup device to perform a focal adjustment, the image pickup device imaging a subject, the imaging method comprising: determining whether or not the subject or the imaging apparatus is moving; changing a frame rate of the image pickup device from a first frame rate to a second frame rate higher than the first frame rate when the subject or the imaging apparatus is determined to be moving; extracting a predetermined signal component from the imaging signal to generate an evaluation value; and performing the focal adjustment on the basis of the evaluation value.

According to a third aspect of the invention, there is provided a computer-readable non-transitory storage medium storing an imaging program by an imaging apparatus which moves a focus lens on the basis of an imaging signal of an image pickup device to perform a focal adjustment, the image pickup device imaging a subject, the program comprising: determining whether or not the subject or the imaging apparatus is moving; changing a frame rate of the image pickup device from a first frame rate to a second frame rate higher than the first frame rate when the subject or the imaging apparatus is determined to be moving; extracting a predetermined signal component from the imaging signal to generate an evaluation value; and performing the focal adjustment on the basis of the evaluation value.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of an imaging apparatus according to one embodiment of the present invention;

FIG. 2 is a flowchart of an AF operation in the imaging apparatus according to one embodiment of the present invention;

FIG. 10 is a flowchart showing peak detection threshold adjustment processing;

FIG. 11 is a flowchart showing in-focus position calculation processing;

FIG. 14 is a flowchart showing direction determination processing according to a modification;

FIG. 16 is a flowchart showing in-scan frame rate changing processing; and

DETAILED DESCRIPTION OF THE INVENTION

Figure 3:
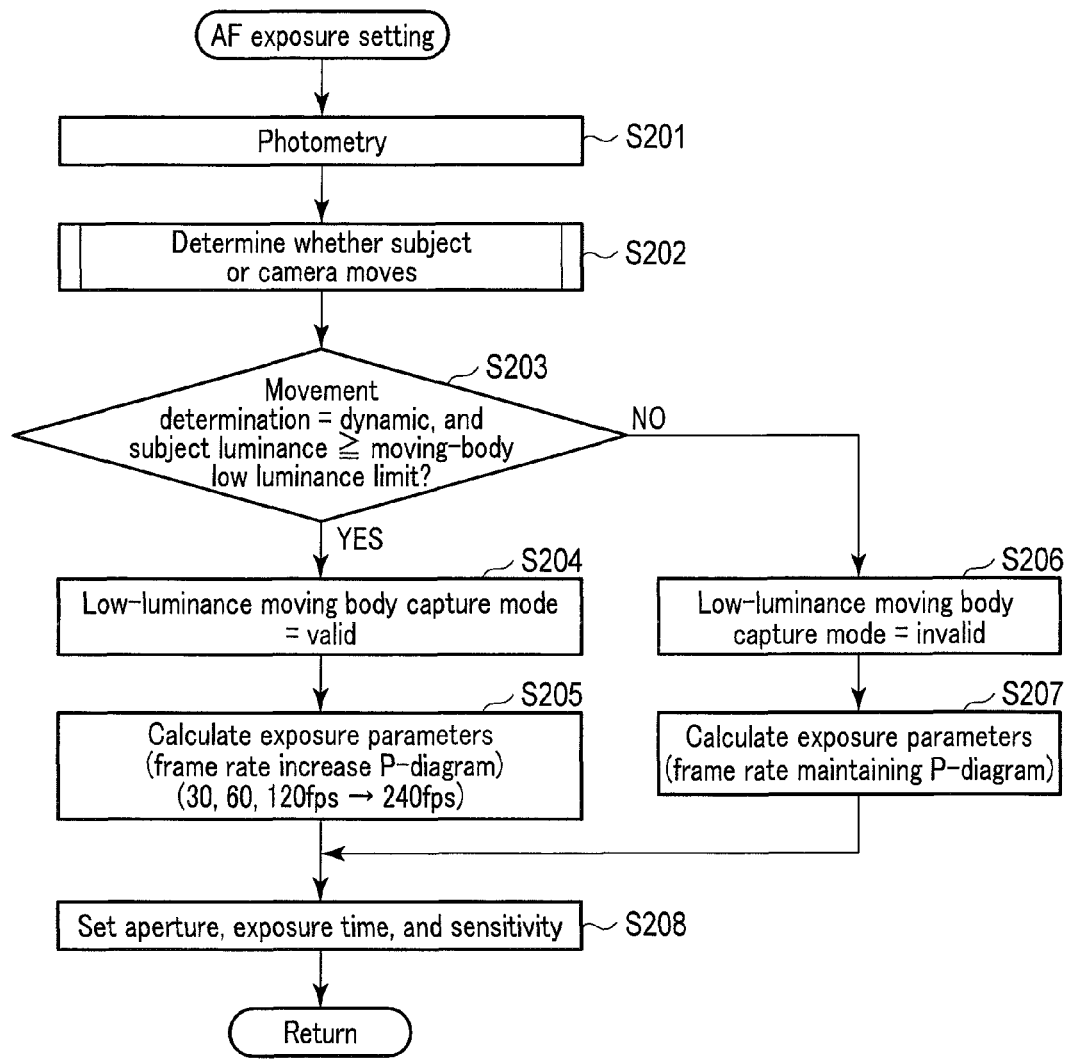
FIG. 3 is a flowchart showing AF exposure setting processing.

Hereinafter, an embodiment of the present invention will be described with reference to the drawings. FIG. 1 is a block diagram of an imaging apparatus according to one embodiment of the present invention. The imaging apparatus shown in FIG. 1 includes an interchangeable lens and a camera body. The interchangeable lens is attached to the camera body. Thus, the interchangeable lens and the camera body operate together. The imaging apparatus in the present embodiment does not necessarily have to be a lens-interchangeable imaging apparatus. For example, the imaging apparatus in the present embodiment may be lens-integrated imaging apparatus.

The interchangeable lens includes a photography lens 100, a diaphragm 101, a lens/diaphragm driving motor 102, a motor drive circuit 103, and a lens-side CPU 104.

The photography lens 100 is an optical system to focus a light flux from a subject on an image pickup device 105 of the camera body. The photography lens 100 includes a focus lens. The focus lens adjusts the focal position of the photography lens 100 by moving in an optical axis direction. The diaphragm 101 is configured to open and close, and restricts the amount of the light flux entering the image pickup device 105 from the photography lens 100. The lens/diaphragm driving motor 102 is, for example, a stepping motor, and respectively drives the focus lens of the photography lens 100 and the diaphragm 101 in accordance with a drive signal from the motor drive circuit 103.

The motor drive circuit 103 inputs the drive signal for driving the focus lens of the photography lens 100 or the diaphragm 101 to the lens/diaphragm driving motor 102 in accordance with a control signal from the lens-side CPU 104.

The lens-side CPU 104 is connected to a camera-side CPU 107 to be able to communicate therewith when the interchangeable lens is attached to the camera body. This lens-side CPU 104 controls various operations of the interchangeable lens in accordance with a control signal from the camera-side CPU 107.

The camera body includes the image pickup device 105, an imaging processing circuit 106, the camera-side CPU 107, an AF evaluation value calculation circuit 108, an AE evaluation value calculation circuit 109, an image processing circuit 110, a memory 111, a display circuit 112, a display device 113, an operation unit 114, and a gyro-sensor 115.

The image pickup device 105 is disposed on the optical axis of the photography lens 100. The image pickup device 105 has pixels. The pixels are two-dimensionally arranged, and generate a charge corresponding to a subject image focused by the photography lens 100. This charge is read as an imaging signal.

The imaging processing circuit 106 controls the driving of the image pickup device 105 and the reading of the imaging signal from each pixel of the image pickup device 105. The imaging processing circuit 106 subjects the imaging signal to various kinds of processing. This processing includes processing such as the removal of analog noise from the imaging signal, and amplification. This processing also includes processing for converting the imaging signal which is an analog signal into imaging data which is a digital signal.

The camera-side CPU 107 which functions as a control circuit controls the whole processing of the camera body. The camera-side CPU 107 sets the frame rate of the image pickup device 105 for, for example, the imaging processing circuit 106. The camera-side CPU 107 performs an AF operation on the basis of an AF evaluation value calculated by the AF evaluation value calculation circuit 108. The camera-side CPU 107 also performs an AE operation on the basis of an AE evaluation value calculated by the AE evaluation value calculation circuit 109. Moreover, the camera-side CPU 107 determines whether or not the camera body is moving on the basis of the output of the gyro-sensor 115. The camera-side CPU 107 also determines whether or not the subject is moving on the basis of motion vectors. The motion vectors are respectively detected in an x-axis direction parallel to the horizontal direction of the image pickup device 105 and a y-axis direction parallel to the vertical direction of the image pickup device 105.

The AF evaluation value calculation circuit 108 which functions as an evaluation value calculation circuit calculates an AF evaluation value. For example, the AF evaluation value calculation circuit 108 extracts a high-frequency signal component of the imaging data. The high-frequency signal component is extracted by, for example, a digital high pass filter. The AF evaluation value calculation circuit 108 calculates the AF evaluation value by accumulating the imaging data of the extracted signal component. The AF evaluation value may be calculated for one specific region of the imaging data, may be calculated for more than one specific region, or may be calculated for all regions.

The AE evaluation value calculation circuit 109 calculates an AE evaluation value. For example, the AE evaluation value calculation circuit 109 calculates luminance data from the imaging data, and integrates the luminance data to calculate the AE evaluation value. The AE evaluation value may be calculated for one specific region of the imaging data, may be calculated for each region of the imaging data, or may be calculated as an average value of all regions.

The image processing circuit 110 processes the imaging data to generate image data for display or image data for recording. This processing includes processing such as white balance correction, gray level correction, and color correction. The processing for the image data for recording includes compression processing. Moreover, the image processing circuit 110 performs decompression processing when the image data for recording recorded in the memory 111 is reproduced.

The memory 111 includes an electrically rewritable non-volatile memory which is configured to be removably attached to the camera body or which is incorporated in the camera body. The image data for recording obtained by the processing in the image processing circuit 110 is recorded in the memory 111.

The display circuit 112 displays various images such as live-view images on the display device 113 on the basis of the image data for display generated by the processing in the image processing circuit 110. The display circuit 112 also displays, on the display device 113, an image based on image data for reproduction obtained by the decompression processing in the image processing circuit 110. The display device 113 is, for example, a liquid crystal display, and displays various images.

The operation unit 114 includes operation members for a user to operate the camera. These operation members are, for example, a power supply switch, a release button, a reproduction button, and a menu button. The operation unit 114 detects the operation states of these operation members, and outputs signals corresponding to the detected operation states.

The gyro-sensor 115 which functions as a movement determination circuit together with the camera-side CPU 107 is a sensor for detecting an angular velocity generated in the camera body. This gyro-sensor 115 detects at least an angular velocity in a Yaw-direction which is an angular velocity around a y-axis along the vertical direction of the camera body (a direction parallel to the y-axis of the image pickup device 105), and an angular velocity in a Pitch-direction which is an angular velocity around an x-axis along the horizontal direction of the camera body (a direction parallel to the x-axis of the image pickup device 105). This gyro-sensor 115 is used to detect the movement of the camera body.

Now, the operation of the focus detection apparatus according to the present embodiment is described. FIG. 2 is a flowchart of the AF operation in the imaging apparatus according to the present embodiment. The AF operation of the imaging apparatus is mainly controlled by the camera-side CPU 107 as described above.

In step S101, the camera-side CPU 107 performs live-view display. In the live-view display, the camera-side CPU 107 sends a control signal to the imaging processing circuit 106. In response to the control signal, the imaging processing circuit 106 starts an exposure operation of the image pickup device 105. The frame rate of the image pickup device 105 at the time of the live-view display is, for example, 30 fps, 60 fps, or 120 fps. After the end of the exposure operation, the imaging processing circuit 106 reads an imaging signal from each pixel of the image pickup device 105 to generate imaging data. The image processing circuit 110 processes the imaging data to generate image data for display. The camera-side CPU 107 then controls the display circuit 112 to display live-view images on the display device 113 on the basis of the image data for display generated in the image processing circuit 110.

In step S102, the camera-side CPU 107 determines whether 1st release input is performed by the user. The 1st release input is, for example, a half-press operation of the release button. When it is determined in step S102 that the 1st release input is not performed, the processing returns to step S101. When it is determined in step S102 that the 1st release input is performed, the processing shifts to step S103.

In step S103, the camera-side CPU 107 performs AF exposure setting processing. The AF exposure setting processing is processing for setting exposure during a scan operation after step S104. The AF exposure setting processing is described below with reference to FIG. 3. FIG. 3 is a flowchart showing the AF exposure setting processing.

In step S201, the camera-side CPU 107 performs photometric processing. As the photometric processing, the camera-side CPU 107 calculates a subject luminance in the imaging data acquired during the live-view display by the AE evaluation value calculated in the AE evaluation value calculation circuit 109.

Figure 4:
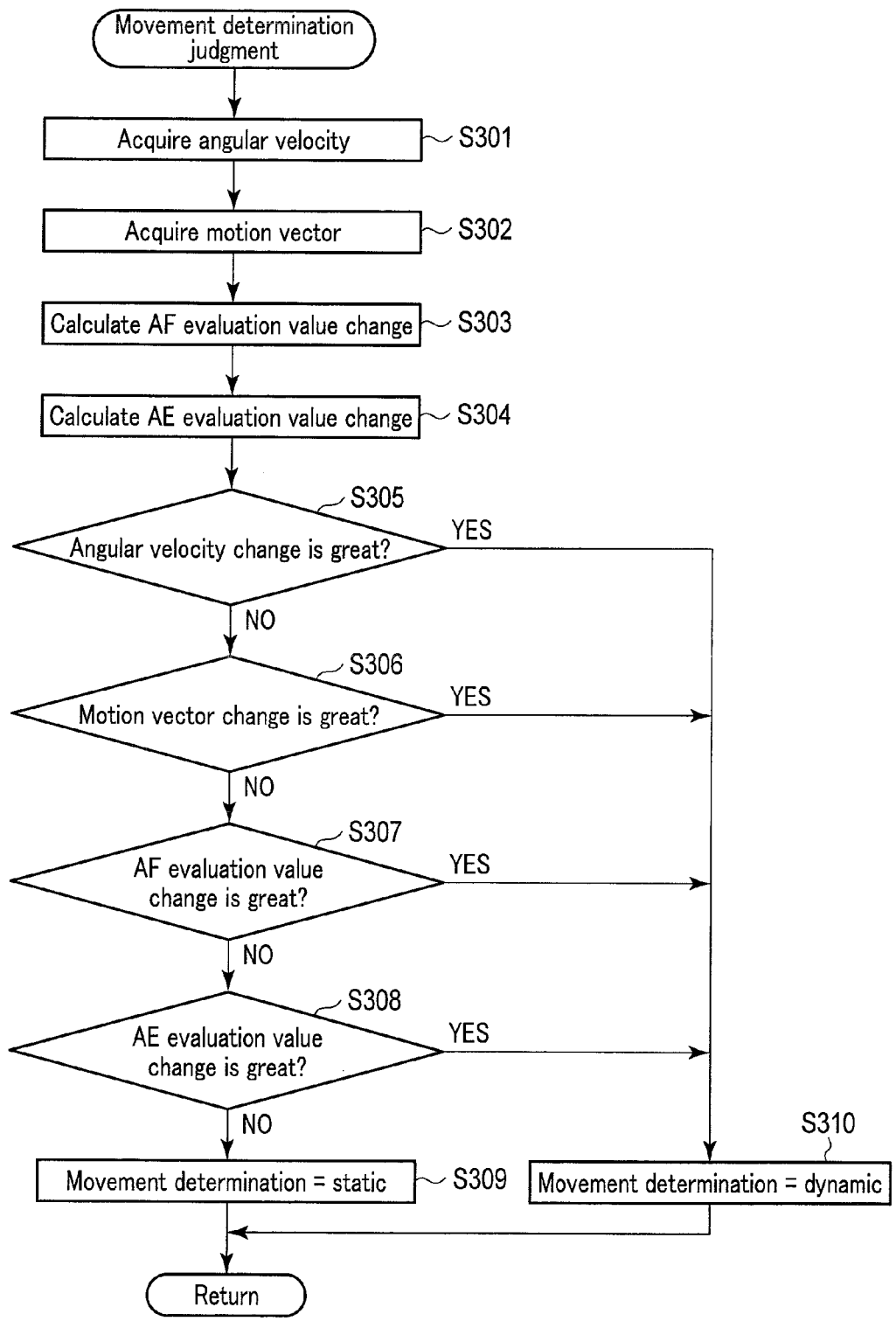
FIG. 4 is a flowchart showing subject/camera movement determination processing.

In step S202, the camera-side CPU 107 performs subject/camera movement determination processing. The subject/camera movement determination processing is processing for determining whether or not the subject or the camera body is moving. The subject/camera movement determination processing is described below with reference to FIG. 4. FIG. 4 is a flowchart showing the subject/camera movement determination processing.

In step S301, the camera-side CPU 107 acquires, by the gyro-sensor 115, information regarding an angular velocity generated in the camera body.

In step S302, the camera-side CPU 107 detects, from the imaging data, motion vectors of the subject in the imaging data. The motion vectors are detected by using, for example, a block matching method to calculate the movement amount and movement direction of the subject in the imaging data sequentially generated in accordance with the live-view display.

In step S303, the camera-side CPU 107 calculates the change amount of the AF evaluation value. The camera-side CPU 107 calculates the change amount (e.g. a sum of absolute difference of the AF evaluation value between the current frame and the previous frame) of the AF evaluation value calculated in the AF evaluation value calculation circuit 108 from the imaging data generated in accordance with the live-view display.

In step S304, the camera-side CPU 107 calculates the change amount of the AE evaluation value. The camera-side CPU 107 calculates the change amount (e.g. a sum of absolute difference of the AE evaluation value between the current frame and the previous frame) of the AE evaluation value calculated in the AE evaluation value calculation circuit 109 from the imaging data generated in accordance with the live-view display.

In step S305, the camera-side CPU 107 determines whether or not the change amount (e.g. the change amount between the current frame and the previous frame) of the angular velocity is greater than a predetermined threshold. When it is determined in step S305 that the change amount of the angular velocity is not greater, the processing shifts to step S306. When it is determined in step S305 that the change amount of the angular velocity is greater, the processing shifts to step S310.

In step S306, the camera-side CPU 107 determines whether or not the change amount (e.g. the change amount between the current frame and the previous frame) of the motion vectors is greater than a predetermined threshold. When it is determined in step S306 that the change amount of the motion vectors is not greater, the processing shifts to step S307. When it is determined in step S306 that the change amount of the motion vectors is greater, the processing shifts to step S310.

In step S307, the camera-side CPU 107 determines whether or not the change amount of the AF evaluation value is greater than a predetermined threshold. When it is determined in step S307 that the change amount of the AF evaluation value is not greater, the processing shifts to step S308. When it is determined in step S307 that the change amount of the AF evaluation value is greater, the processing shifts to step S310.

In step S308, the camera-side CPU 107 determines whether or not the change amount of the AE evaluation value is greater than a predetermined threshold. When it is determined in step S308 that the change amount of the AE evaluation value is not greater, the processing shifts to step S309. When it is determined in step S308 that the change amount of the AE evaluation value is greater, the processing shifts to step S310.

In step S309, the camera-side CPU 107 sets the value of a movement determination flag to "static". The processing in FIG. 4 then ends, and the processing shifts to step S203 in FIG. 3. The movement determination flag indicating the static state means a situation in which both the subject and the camera body are considered to be static.

In step S310, the camera-side CPU 107 sets the value of a movement determination flag to "dynamic". The processing in FIG. 4 then ends, and the processing shifts to step S203 in FIG. 3. The movement determination flag indicating the dynamic state means a situation in which at least one of the subject and the camera body is considered to be moving.

Here, back to the explanation of FIG. 3, the camera-side CPU 107 determines in step S203 whether or not the movement determination flag indicates the dynamic state and whether the subject luminance is equal to or more than a moving-body low luminance limit. The moving-body low luminance limit is a threshold of the subject luminance at which a necessary exposure amount can be ensured even with a high frame rate. For example, an APEX value of Bv-5 can be used as the moving-body low luminance limit. It should be understood that the moving-body low luminance limit is not limited to Bv-5 and can be changed by the value of the frame rate of the image pickup device 105 to be maintained in the scan operation in a later-described low-luminance moving body capture mode. When it is determined in step S203 that the movement determination flag indicates the dynamic state and the subject luminance is equal to or more than the moving-body low luminance limit, the processing shifts to step S204. When it is determined in step S203 that the movement determination flag does not indicate the dynamic state or the subject luminance is not equal to or more than the moving-body low luminance limit, the processing shifts to step S206.

In step S204, the camera-side CPU 107 validates the low-luminance moving body capture mode which is one of AF modes. The low-luminance moving body capture mode is a mode effective in capturing a rapidly moving subject at the time of low-luminance AF.

Figure 5A:
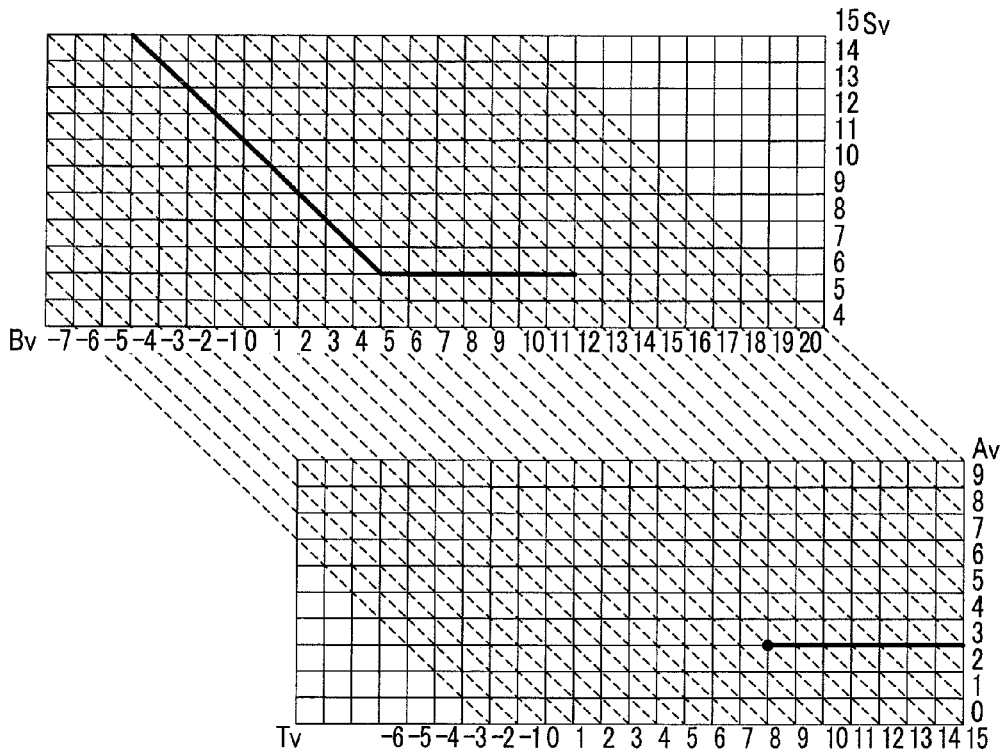
FIG. 5A is a diagram showing a frame rate increase P-diagram.

In step S205, as an AE operation, the camera-side CPU 107 calculates an aperture value Av, an exposure time Tv, and a sensitivity value Sv as exposure parameters in accordance with a frame rate increase P-diagram shown in FIG. 5A. The processing then shifts to step S208. The frame rate increase P-diagram is a P-diagram in which the frame rate of the image pickup device 105 can be kept higher than the frame rate at the time of the live-view display regardless of the value of the subject luminance Bv. In the frame rate increase P-diagram, the value of the exposure time Tv is kept at 8 or more (1/250 seconds or less) even if the value of the subject luminance Bv decreases. Therefore, the frame rate of the image pickup device 105 can be kept at, for example, 240 fps which is a value higher than the frame rate at the time of the live-view display. Thus, while the low-luminance moving body capture mode is valid, the performance of capturing a rapidly moving subject can be improved by increasing the frame rate of the image pickup device 105.

In step S206, the camera-side CPU 107 invalidates the low-luminance moving body capture mode.

Figure 5B:
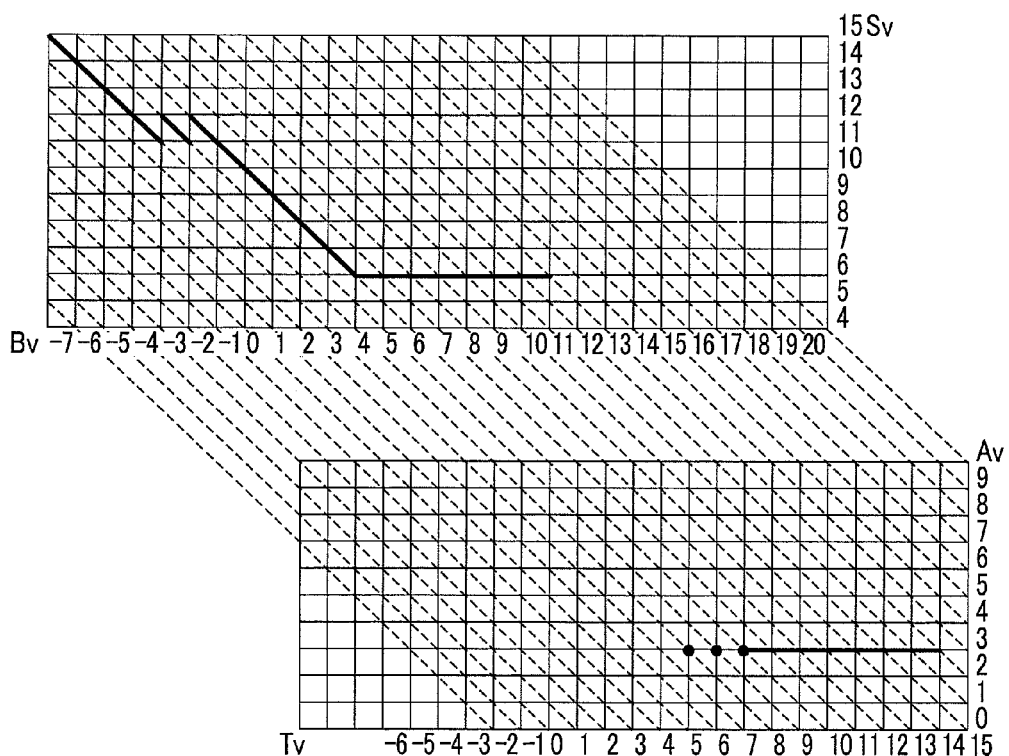
FIG. 5B is a diagram showing a frame rate maintaining P-diagram.

In step S207, as an AE operation, the camera-side CPU 107 calculates an aperture value Av, an exposure time Tv, and a sensitivity value Sv as exposure parameters in accordance with a frame rate maintaining P-diagram shown in FIG. 5B. The processing then shifts to step S208. The frame rate maintaining P-diagram is a P-diagram in which the frame rate of the image pickup device 105 at the time of the live-view display can be maintained as much as possible. That is, in the frame rate maintaining P-diagram, the exposure time Tv at the time of the live-view display is basically maintained, and the value of the exposure time Tv decreases if the value of the subject luminance By decreases to such a degree that the exposure time Tv at the time of the live-view display cannot be maintained. Thus, while the low-luminance moving body capture mode is invalid, it is possible to ensure the exposure amount at the low luminance and improve focusing accuracy by changing the frame rate of the image pickup device 105 in accordance with the subject luminance.

In step S208, the camera-side CPU 107 sends information regarding the aperture value Av to the lens-side CPU 104 as control information. The camera-side CPU 107 also sends information regarding the exposure time Tv and the sensitivity value Sv to the imaging processing circuit 106 as control information. The processing in FIG. 3 then ends, and the processing shifts to step S104 in FIG. 2. After this, the exposure operation is performed in accordance with the conditions set in step S208.

Here, back to the explanation of FIG. 2, the camera-side CPU 107 sends a control signal to the lens-side CPU 104 to start scan drive of the focus lens, in step S104. Accordingly, the lens-side CPU 104 sends a control signal to the motor drive circuit 103 to start the driving of the focus lens by a predetermined amount in a predetermined direction (e.g. close direction).

Figure 6:
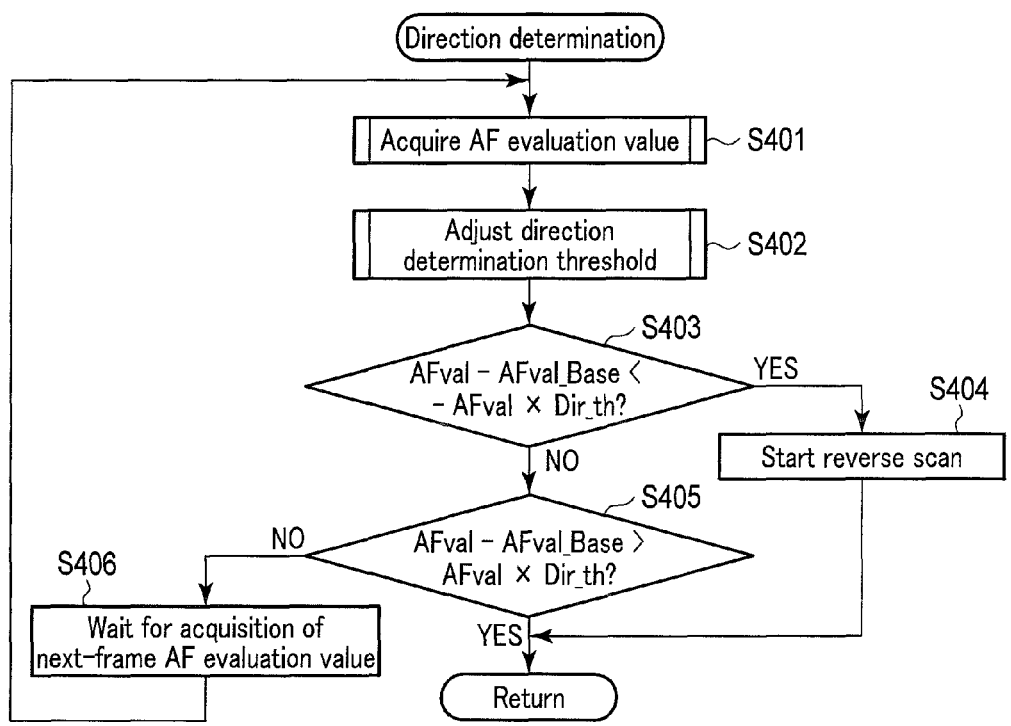
FIG. 6 is a flowchart showing direction determination processing.

In step S105, the camera-side CPU 107 performs direction determination processing. The direction determination processing is processing for determining the direction to perform the scan drive. The direction determination processing is described below. FIG. 6 is a flowchart showing the direction determination processing.

Figure 7:
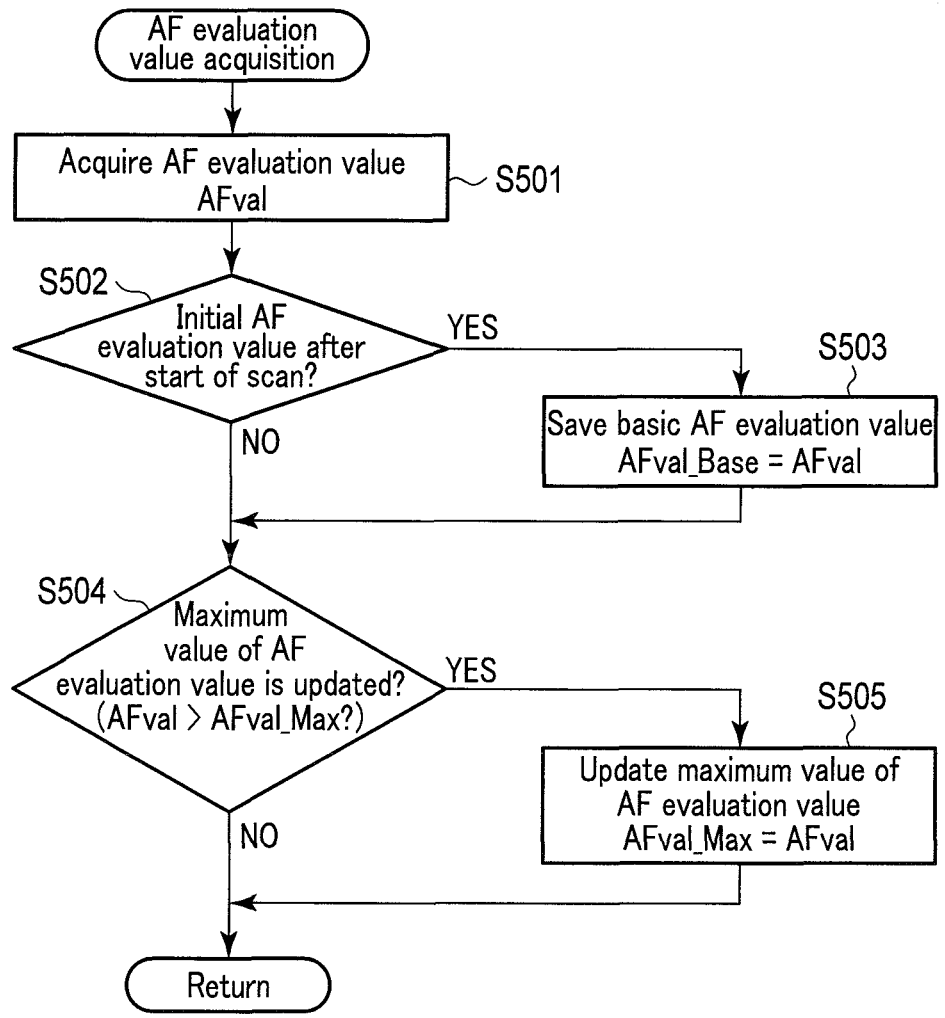
FIG. 7 is a flowchart showing AF evaluation value acquisition processing.

In step S401, the camera-side CPU 107 performs AF evaluation value acquisition processing. The AF evaluation value acquisition processing is processing for acquiring an AF evaluation value for AF. The AF evaluation value acquisition processing is described below with reference to FIG. 7. FIG. 7 is a flowchart showing the AF evaluation value acquisition processing.

In step S501, the camera-side CPU 107 acquires an AF evaluation value from the AF evaluation value calculation circuit 108. For the purpose of explanation, the AF evaluation value acquired in step S501 is referred to as AFval.

In step S502, the camera-side CPU 107 determines whether or not the AF evaluation value AFval is an initial AF evaluation value after the start of the scan drive. When it is determined in step S502 that the AF evaluation value AFval is the initial AF evaluation value after the start of the scan drive, the processing shifts to step S503. When it is determined in step S502 that the AF evaluation value AFval is not the initial AF evaluation value after the start of the scan drive, the processing shifts to step S504.

In step S503, the camera-side CPU 107 saves the value of the AF evaluation value AFval as the value of a basic evaluation value AFval_Base. The processing then shifts to step S504.

In step S504, the camera-side CPU 107 determines whether to update the value of a maximum value AFval_Max of the AF evaluation value. This is a determination of whether or not the AF evaluation value AFval is higher than the maximum value AFval_Max. When it is determined that the AF evaluation value AFval is higher than the maximum value AFval_Max, the value of the maximum value AFval_Max is determined to be updated. In the initial determination in step S504 after the start of the scan drive, the initial value of the maximum value AFval_Max is set so that the value of the maximum value AFval_Max is always determined to be updated. When it is determined in step S504 that the value of the maximum value AFval_Max of the AF evaluation value is updated, the processing shifts to step S505. When it is determined in step S504 that the value of the maximum value AFval_Max of the AF evaluation value is not updated, the processing in FIG. 7 ends, and the processing shifts to step S402 in FIG. 6.

In step S505, the camera-side CPU 107 updates the value of the maximum value AFval_Max of the AF evaluation value to the value of the AF evaluation value AFval. The processing in FIG. 7 then ends, and the processing shifts to step S402 in FIG. 6.

Figure 8:
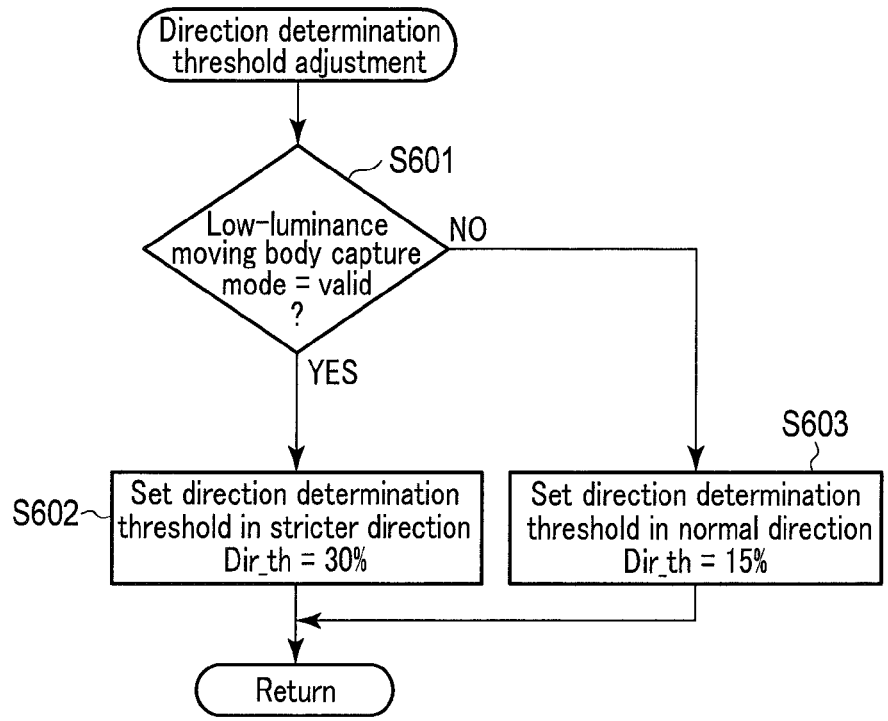
FIG. 8 is a flowchart showing direction determination threshold adjustment processing.

Here, back to the explanation of FIG. 6, the camera-side CPU 107 performs direction determination threshold adjustment processing in step S402. The direction determination threshold adjustment processing is processing for adjusting a threshold to determine the direction determination of the scan drive. The direction determination threshold adjustment processing is described below with reference to FIG. 8. FIG. 8 is a flowchart showing the direction determination threshold adjustment processing.

In step S601, the camera-side CPU 107 determines whether or not the low-luminance moving body capture mode is valid at present. When it is determined in step S601 that the low-luminance moving body capture mode is valid, the processing shifts to step S602. When it is determined in step S601 that the low-luminance moving body capture mode is not valid, the processing shifts to step S603.

In step S602, the camera-side CPU 107 sets a direction determination threshold to a threshold in a stricter side. The processing in FIG. 8 then ends, and the processing shifts to step S403 in FIG. 6. This setting is setting such that a coefficient Dir_th for setting the later-described direction determination threshold will be higher than a normal threshold. For example, in step S602, the coefficient Dir_th is set to 30%. This value is an example and can be suitably changed. The threshold in the stricter side has only to be higher than the normal threshold.

In step S603, the camera-side CPU 107 sets the direction determination threshold to the normal threshold. The processing in FIG. 8 then ends, and the processing shifts to step S403 in FIG. 6. For example, in step S603, the coefficient Dir_th is set to 15%. This value is an example and can be suitably changed.

Here, back to the explanation of FIG. 6, the camera-side CPU 107 determines in step S403 whether or not the difference between the AF evaluation value AFval and the basic evaluation value AFval_Base is smaller than a direction determination threshold −AFval×Dir_th. When it is determined in step S403 that the difference between the AF evaluation value AFval and the basic evaluation value AFval_Base is smaller than the direction determination threshold −AFval×Dir_th, the processing shifts to step S404. When it is determined in step S403 that the difference between the AF evaluation value AFval and the basic evaluation value AFval_Base is not smaller than the direction determination threshold −AFval×Dir_th, the processing shifts to step S405.

In step S404, the camera-side CPU 107 sends a control signal to the lens-side CPU 104 to start scan drive of the focus lens in a reverse direction. Accordingly, the lens-side CPU 104 sends a control signal to the motor drive circuit 103 to reverse the driving direction of the focus lens. The processing in FIG. 6 then ends, and the processing shifts to step S106 in FIG. 2. In this case, the direction of the scan drive is determined to be reverse to the driving direction so far.

In step S405, the camera-side CPU 107 determines whether or not the difference between the AF evaluation value AFval and the basic evaluation value AFval_Base is greater than a direction determination threshold AFval×Dir_th. When it is determined in step S405 that the difference between the AF evaluation value AFval and the basic evaluation value AFval_Base is greater than the direction determination threshold AFval×Dir_th, the processing in FIG. 6 ends, and the processing shifts to step S106 in FIG. 2. In this case, the direction of the scan drive is determined to be the same as the driving direction so far. When it is determined in step S405 that the difference between the AF evaluation value AFval and the basic evaluation value AFval_Base is not greater than the direction determination threshold AFval×Dir_th, the processing shifts to step S406.

In step S406, the camera-side CPU 107 waits until an AF evaluation value is calculated in the AF evaluation value calculation circuit 108 in the next frame. When the AF evaluation value is calculated, the processing returns to step S401. In this case, the direction of the scan drive is not determined.

In the direction determination processing according to the present embodiment, the threshold for determining the direction determination is the threshold in the stricter side while the low-luminance moving body capture mode is valid. Thus, the direction determination is not decided unless the AF evaluation value AFval changes to be much higher than the basic evaluation value AFval_Base. Therefore, even when a high AF evaluation value cannot be obtained due to low luminance, it is possible to reduce the possibility of a mistake of a determination of the direction of the scan drive during AF. Thus, false focusing can be inhibited.

Figure 9:
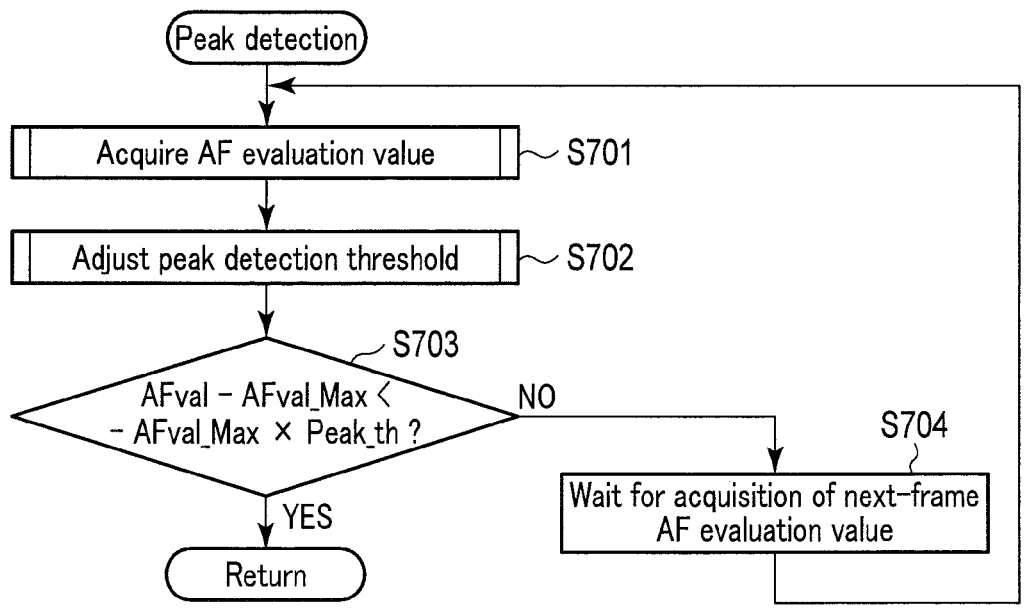
FIG. 9 is a flowchart showing peak detection processing.

Here, back to the explanation of FIG. 2, the camera-side CPU 107 performs peak detection processing in step S106. The peak detection processing is processing for detecting the peak of the AF evaluation value. The peak detection processing is described below with reference to FIG. 9. FIG. 9 is a flowchart showing the peak detection processing.

In step S701, the camera-side CPU 107 performs the AF evaluation value acquisition processing. The AF evaluation value acquisition processing is the same processing described with reference to FIG. 7. Therefore, this processing is not described.

In step S702, the camera-side CPU 107 performs peak detection threshold adjustment processing. The peak detection threshold adjustment processing is processing for adjusting a threshold to determine whether or not the AF evaluation value is a peak. The peak detection threshold adjustment processing is described below with reference to FIG. 10. FIG. 10 is a flowchart showing the peak detection threshold adjustment processing.

In step S801, the camera-side CPU 107 determines whether or not the low-luminance moving body capture mode is valid at present. When it is determined in step S801 that the low-luminance moving body capture mode is valid, the processing shifts to step S802. When it is determined in step S801 that the low-luminance moving body capture mode is not valid, the processing shifts to step S803.

In step S802, the camera-side CPU 107 sets a peak detection threshold to a threshold in a stricter side. The processing in FIG. 10 then ends, and the processing shifts to step S703 in FIG. 9. This setting is setting such that a coefficient Peak_th for setting the later-described peak detection threshold will be higher than a normal threshold.

For example, in step S802, the coefficient Peak_th is set to 30%. This value is an example and can be suitably changed. The threshold in the stricter side has only to be higher than the normal threshold.

In step S803, the camera-side CPU 107 sets the peak detection threshold to the normal threshold. The processing in FIG. 10 then ends, and the processing shifts to step S703 in FIG. 9. For example, in step S803, the coefficient Peak_th is set to 15%. This value is an example and can be suitably changed.

Here, back to the explanation of FIG. 9, the camera-side CPU 107 determines in step S703 whether or not the difference between the AF evaluation value AFval and the maximum value AFval_Max is smaller than −AFval_Max× Peak_th. When it is determined in step S703 that the difference between the AF evaluation value AFval and the maximum value AFval_Max is smaller than −AFval_Max× Peak_th, the processing in FIG. 9 ends, and the processing shifts to step S107 in FIG. 2. Suppose, in this instance, that the peak of the AF evaluation value is detected. When it is determined in step S703 that the difference between the AF evaluation value AFval and the maximum value AFval_Max is not smaller than −AFval_Max×Peak_th, the processing shifts to step S704.

In step S704, the camera-side CPU 107 waits until an AF evaluation value is calculated in the AF evaluation value calculation circuit 108 in the next frame. When the AF evaluation value is calculated, the processing returns to step S701. In this case, the peak of the AF evaluation value is not detected.

In the peak detection processing according to the present embodiment, the threshold for peak detection is the threshold in the stricter side while the low-luminance moving body capture mode is valid. Thus, the peak is not detected unless the difference between the AF evaluation value AFval and the maximum value AFval_Max becomes sufficiently small. Therefore, even when a high AF evaluation value cannot be obtained due to low luminance, it is possible to reduce the possibility of an incorrect detection of a peak during AF. Thus, false focusing can be inhibited.

Here, back to the explanation of FIG. 2, the camera-side CPU 107 performs in-focus position calculation processing in step S107. The in-focus position calculation processing is processing for calculating the position of the focus lens corresponding to the true peak of the AF evaluation value. The in-focus position calculation processing is described below with reference to FIG. 11. FIG. 11 is a flowchart showing the in-focus position calculation processing.

In step S901, the camera-side CPU 107 determines whether or not the low-luminance moving body capture mode is valid at present. When it is determined in step S901 that the low-luminance moving body capture mode is valid, the processing shifts to step S902. When it is determined in step S901 that the low-luminance moving body capture mode is not valid, the processing shifts to step S903.

In step S902, the camera-side CPU 107 sets a large number of interpolation points of the in-focus position. The processing then shifts to step S904. For example, the number of interpolation points is set to 5. This value is an example and can be suitably changed. When the number of interpolation points is larger, it is possible to more accurately find an in-focus position.

In step S903, the camera-side CPU 107 sets a smaller number of interpolation points of the in-focus position. The processing then shifts to step S904. For example, the number of interpolation points is set to 3. This value is an example and can be suitably changed.

In step S904, the camera-side CPU 107 calculates the in-focus position by interpolation computation that uses focus lens positions for the number of interpolation points around the focus lens position corresponding to the AF evaluation value which has been detected as a peak in the peak detection. The processing in FIG. 11 then ends, and the processing shifts to step S108 in FIG. 2. Various computations are used as the interpolation computation. For example, Lagrangian interpolation or a least squares method is used as the interpolation computation.

Here, back to the explanation of FIG. 2, the camera-side CPU 107 sends a control signal to the lens-side CPU 104 to drive the focus lens to the in-focus position for the focal adjustment of the photography lens 100, in step S108. Accordingly, the lens-side CPU 104 sends a control signal to the motor drive circuit 103 to drive the focus lens to the in-focus position. The processing in FIG. 2 then ends.

As described above, according to the present embodiment, the frame rate of the imaging apparatus at the time of low-luminance AF is set in accordance with the degree of the movement of the subject or the imaging apparatus. This operation is further described below.

Figure 12:
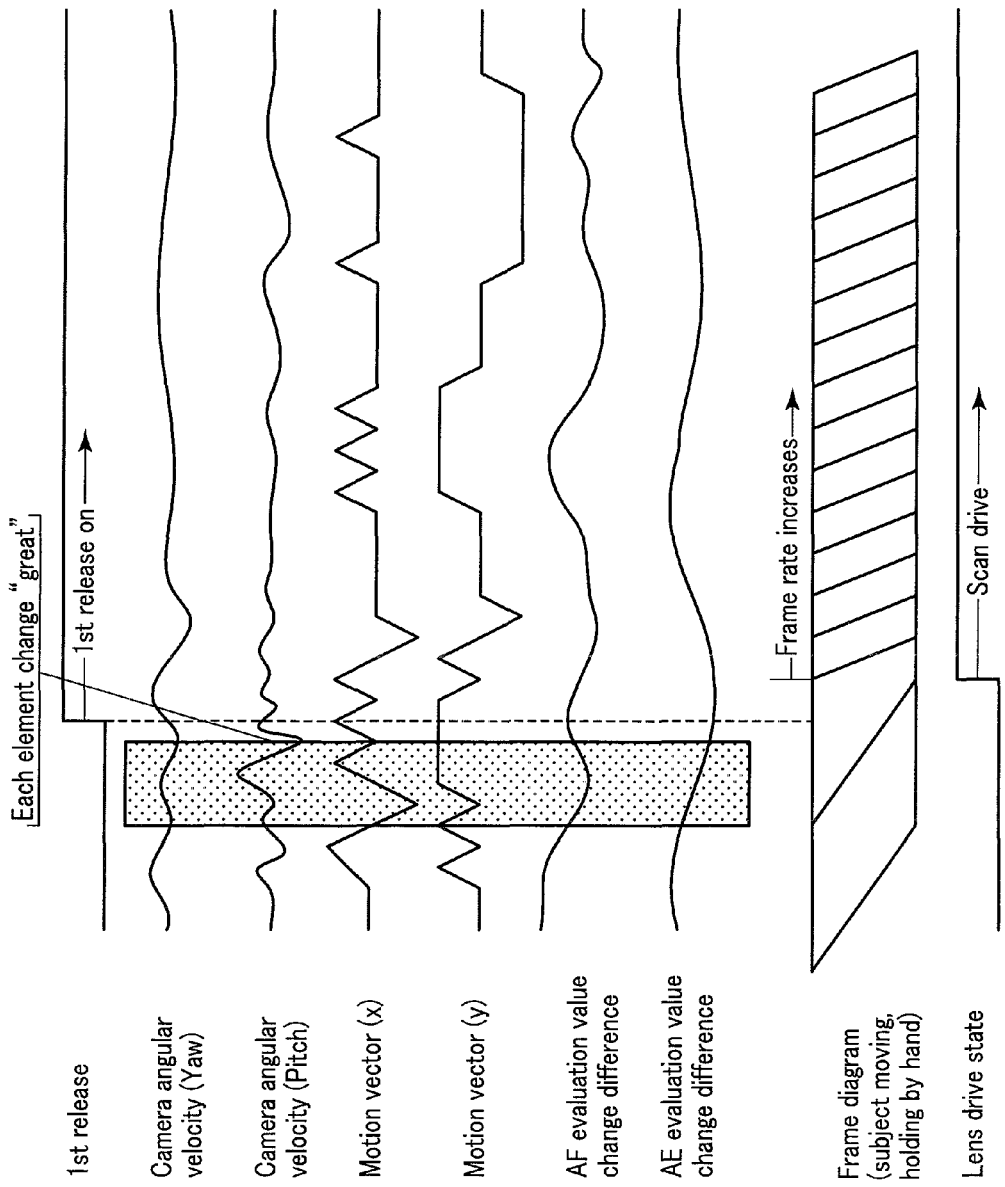
FIG. 12 is a timing chart showing the setting of the frame rate of an image pickup device at the time of low-luminance AF in which a subject is moving and in which the imaging apparatus is held by hand.

FIG. 12 is a timing chart showing the setting of the frame rate of the image pickup device at the time of low-luminance AF in which the subject is moving and in which the imaging apparatus is held by hand. FIG. 12 respectively shows, from the top, the timing of 1st release input, the change of the angular velocity (Yaw) of the camera body over time, the change of the angular velocity (Pitch) of the camera body over time, the change of the motion vector (x) over time, the change of the motion vector (y) over time, the change of the AF evaluation value over time, the change of the AE evaluation value over time, the change of the exposure operation (an image obtained by the exposure operation), and the change of the lens drive state over time.

When the subject and the imaging apparatus are moving together, it is considered that all of the angular velocity (Yaw) of the camera body, the angular velocity (Pitch) of the camera body, the motion vector (x), the motion vector (y), the AF evaluation value, and the AE evaluation value immediately before the start of the scan operation by the 1st release input greatly change as shown in FIG. 12. In this case, the camera-side CPU 107 validates the low-luminance moving body capture mode to raise the frame rate of the image pickup device 105. As a result, it is possible to correctly capture a rapidly moving subject to perform accurate AF. In the present embodiment, when the subject luminance is lower than the moving-body low luminance limit, the frame rate of the image pickup device 105 is not raised even if the subject or the imaging apparatus is moving. Thus, it is possible to secure the minimum required exposure amount to acquire the AF evaluation value during the scan operation.

Figure 13:
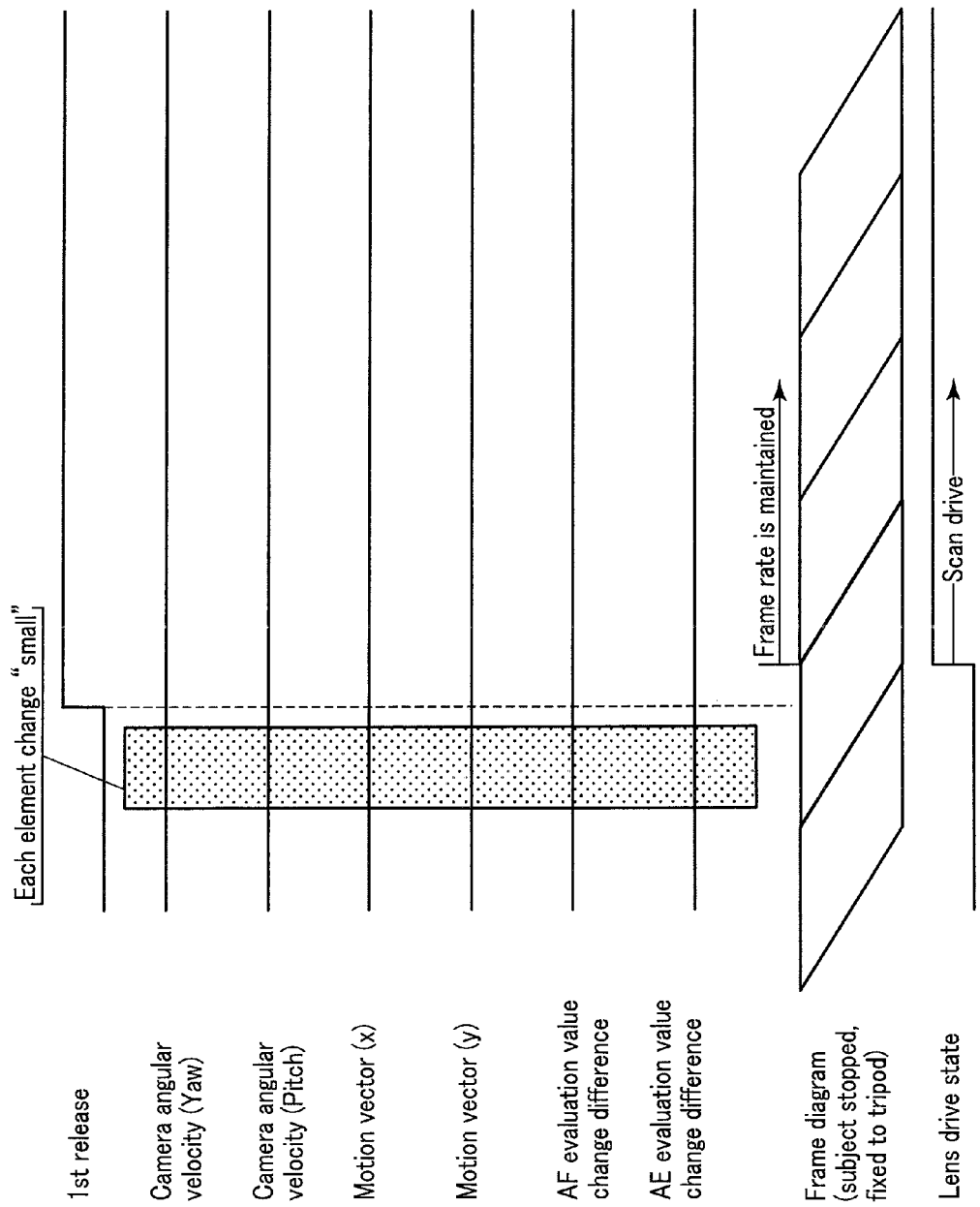
FIG. 13 is a timing chart showing the setting of the frame rate of the image pickup device at the time of low-luminance AF in which the subject remains stationary and in which the imaging apparatus is fixed to, for example, a tripod.

FIG. 13 is a timing chart showing the setting of the frame rate of the image pickup device at the time of low-luminance AF in which the subject remains stationary and in which the imaging apparatus is fixed to, for example, a tripod.

When both the subject and the imaging apparatus remain stationary, the angular velocity (Yaw) of the camera body, the angular velocity (Pitch) of the camera body, the motion vector (x), the motion vector (y), the AF evaluation value, and the AE evaluation value immediately before the start of the scan operation by the 1st release input hardly change as shown in FIG. 13. In this case, the camera-side CPU 107 invalidates the low-luminance moving body capture mode to maintain the frame rate of the image pickup device 105. As a result, it is possible to increase the exposure amount to perform accurate AF for the low-luminance subject.

[Modifications]

Modifications of the present embodiment are described below. For example, in the embodiment described above, the frame rate is changed before the start of the scan operation. In contrast, the frame rate may be changed during the scan operation. Such a modification is described below. The differences between the modification and the above embodiment are mainly described below.

FIG. 14 is a flowchart showing direction determination processing according to the modification. The processes in FIG. 14 are performed instead of the processes in FIG. 6. In FIG. 14, the same processes as those in FIG. 6 are indicated with the same step numbers as those in FIG. 6.

In step S410, the camera-side CPU 107 performs in-scan frame rate changing processing. The in-scan frame rate changing processing is processing for dynamically changing the frame rate during the scan drive. The in-scan frame rate changing processing will be described in detail later, and the explanation is continued here on the assumption that the frame rate has been set by the in-scan frame rate changing processing. After the in-scan frame rate changing processing in step S410, the processing shifts to step S401. The processing in and after step S401 is the same as that in FIG. 4. Therefore, this processing is not described.

Figure 15:
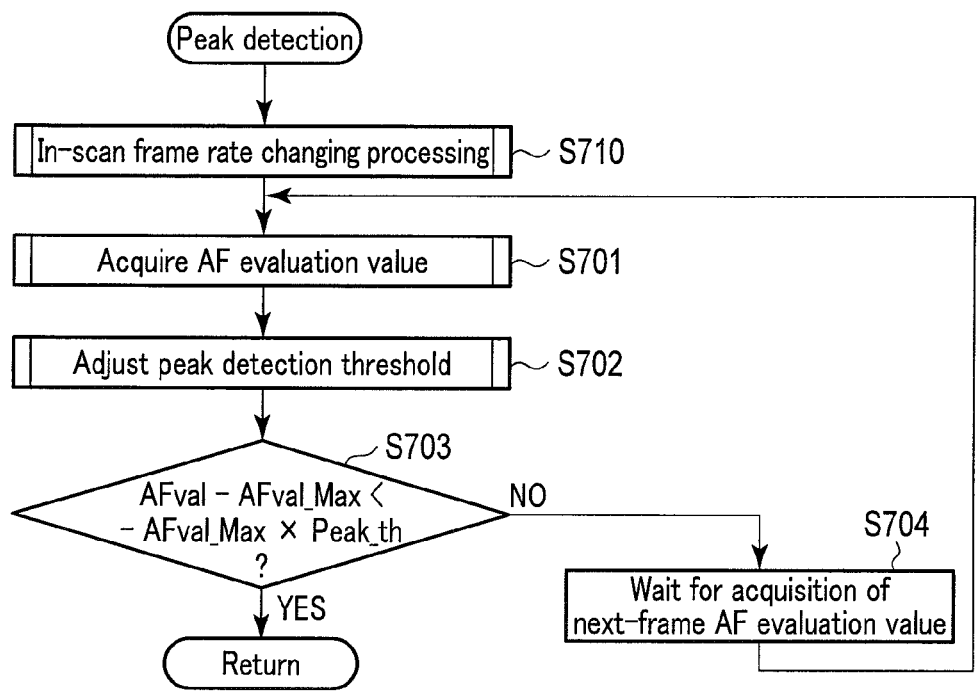
FIG. 15 is a flowchart showing peak detection processing according to the modification.

FIG. 15 is a flowchart showing peak detection processing according to the modification. The processes in FIG. 15 are performed instead of the processes in FIG. 9. In FIG. 15, the same processes as those in FIG. 9 are indicated with the same step numbers as those in FIG. 9.

In step S710, the camera-side CPU 107 performs the in-scan frame rate changing processing. The in-scan frame rate changing processing will be described in detail later, and the explanation is continued here on the assumption that the frame rate has been set by the in-scan frame rate changing processing. After the in-scan frame rate changing processing in step S710, the processing shifts to step S701. The processing in and after step S701 is the same as that in FIG. 9. Therefore, this processing is not described.

FIG. 16 is a flowchart showing the in-scan frame rate changing processing. In step S1001, the camera-side CPU 107 performs photometric processing. The photometric processing is performed in the same manner as in step S201.

In step S1002, the camera-side CPU 107 performs the subject/camera movement determination processing. This processing is performed in the same manner as in FIG. 4. However, the processing shifts to step S1003 in FIG. 16 after the end of the subject/camera movement determination processing in step S1002.

In step S1003, the camera-side CPU 107 determines whether or not the movement determination flag indicates the dynamic state and the subject luminance is equal to or more than the moving-body low luminance limit. When it is determined in step S1003 that the movement determination flag indicates the dynamic state and the subject luminance is equal to or more than the moving-body low luminance limit, the processing shifts to step S1004. When it is determined in step S1003 that the movement determination flag does not indicate the dynamic state or the subject luminance is not equal to or more than the moving-body low luminance limit, the processing shifts to step S1006.

In step S1004, the camera-side CPU 107 validates the low-luminance moving body capture mode which is one of AF modes.

In step S1005, as an AE operation for acquiring an AF evaluation value, the camera-side CPU 107 calculates an aperture value Av, an exposure time Tv, and a sensitivity value Sv as exposure parameters in accordance with the frame rate increase P-diagram shown in FIG. 5A. The subject luminance Bv in this case is generated from a pixel signal in the region for AF in the acquisition of the previous AF evaluation value. The processing then shifts to step S1008.

In step S1006, the camera-side CPU 107 invalidates the low-luminance moving body capture mode.

In step S1007, as an AE operation for acquiring an AF evaluation value, the camera-side CPU 107 calculates an aperture value Av, an exposure time Tv, and a sensitivity value Sv as exposure parameters in accordance with the frame rate maintaining P-diagram shown in FIG. 5B. The processing then shifts to step S1008.

In step S2008, the camera-side CPU 107 sends information regarding the aperture value Av to the lens-side CPU 104 as control information. The camera-side CPU 107 also sends information regarding the exposure time Tv and the sensitivity value Sv to the imaging processing circuit 106 as control information. The processing in FIG. 16 then ends. After this, the exposure operation is performed in accordance with the conditions set in step S1008.

As described above, according to the present modification, the frame rate of the image pickup device is changed even during the scan operation. This operation is further described below.

Figure 17:
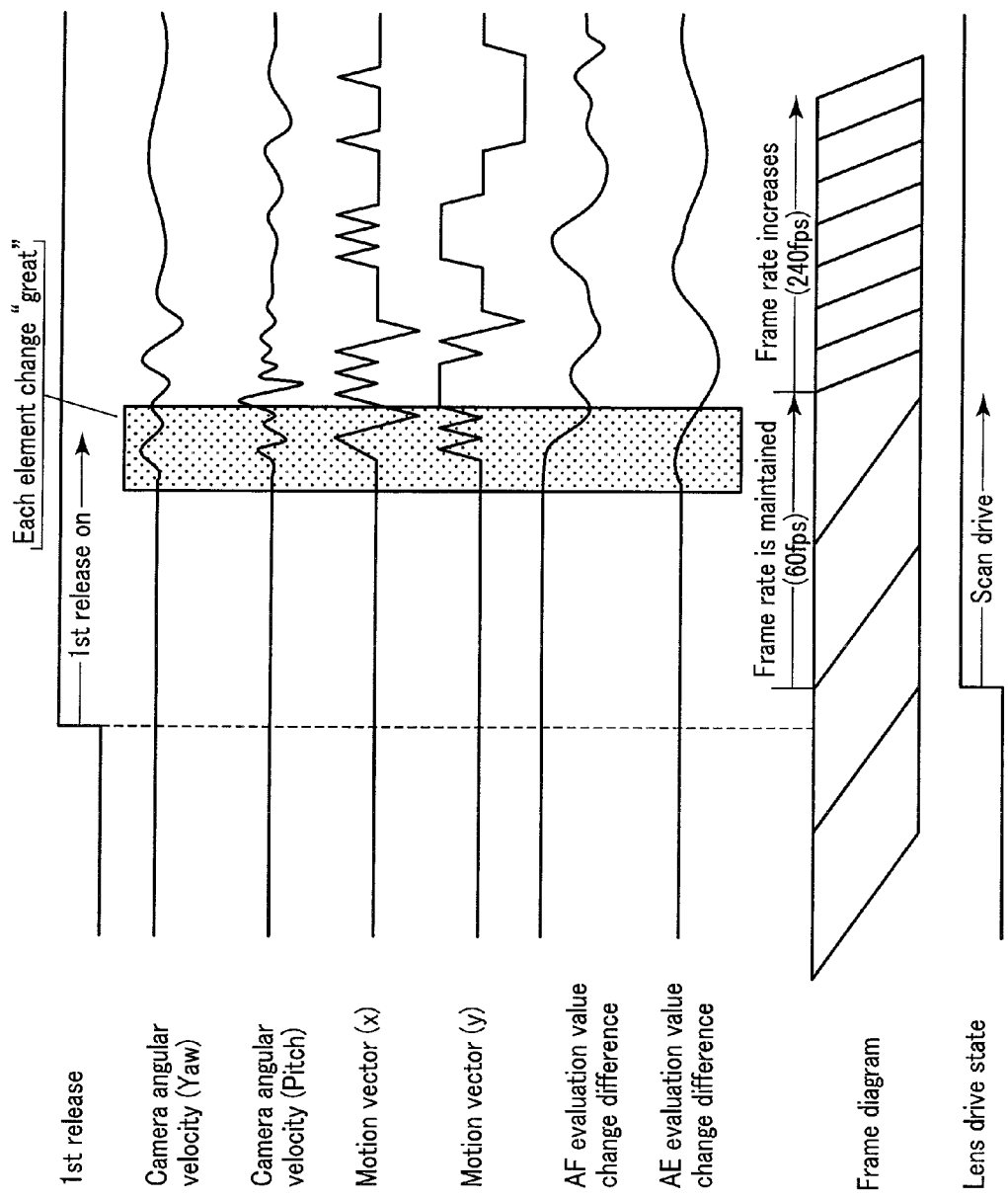
FIG. 17 is a timing chart showing the setting of the frame rate of an image pickup device at the time of low-luminance AF in which the state of the subject or the imaging apparatus changes during a scan operation.

FIG. 17 is a timing chart showing the setting of the frame rate of an image pickup device at the time of low-luminance AF in which the state of the subject or the imaging apparatus changes during the scan operation.

At the start of the scan operation, both the subject and the imaging apparatus remain stationary. In this instance, the angular velocity (Yaw) of the camera body, the angular velocity (Pitch) of the camera body, the motion vector (x), the motion vector (y), the AF evaluation value, and the AE evaluation value immediately before the start of the scan operation by the 1st release input hardly change as shown in FIG. 17. In this case, the camera-side CPU 107 invalidates the low-luminance moving body capture mode to maintain the frame rate of the image pickup device 105. As a result, it is possible to increase the exposure amount to perform accurate AF for the low-luminance subject.

In contrast, when it is determined that the subject or the imaging apparatus is moving during the scan operation, it is considered that all of the angular velocity (Yaw) of the camera body, the angular velocity (Pitch) of the camera body, the motion vector (x), the motion vector (y), the AF evaluation value, and the AE evaluation value immediately before the start of the scan operation by the 1st release input greatly change as shown in FIG. 17. In this case, the camera-side CPU 107 validates the low-luminance moving body capture mode to raise the frame rate of the image pickup device 105. As a result, it is possible to correctly capture a rapidly moving subject to perform accurate AF.

The camera-side CPU 107 performs in-scan frame rate changing processing in step S410 in FIG. 14. In contrast, the camera-side CPU 107 may perform in-scan frame rate changing processing concurrently while the camera-side CPU 107 performs step S401 to step S406 in FIG. 14. The camera-side CPU 107 performs in-scan frame rate changing processing in step S710 in FIG. 15. In contrast, the camera-side CPU 107 may perform in-scan frame rate changing processing concurrently while the camera-side CPU 107 performs step S701 to step S704 in FIG. 15.

As described above, according to the present modification, the frame rate of the image pickup device is set during the scan operation as well so that more accurate AF for the low-luminance subject can be performed.

While the present invention has been described above in connection with the embodiment, it should be understood that the present invention is not limited to the embodiment described above and various modifications and applications can be made within the scope of the spirit of the present invention. For example, in the embodiment described above, the lens drive during the AF operation is scan drive. In contrast, the technique according to the embodiment described above is also applicable when the lens drive during the AF operation is wobbling drive.

Each of the processes according to the embodiment described above can also be stored as a program that can be executed by, for example, a CPU as a computer. This can also be stored and distributed in a storage medium of an external storage device such as a memory card, a magnetic disk, an optical disk, or a semiconductor memory. The CPU, for example, then reads the program stored in the storage medium of the external storage device, and can perform the processing described above when the operation is controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus which moves a focus lens on the basis of an imaging signal of an image pickup device to perform a focal adjustment, the image pickup device imaging a subject, the imaging apparatus comprising:
   an evaluation value calculation circuit which extracts a predetermined signal component from the imaging signal to generate an evaluation value;
   a control circuit which performs the focal adjustment on the basis of the evaluation value; and
   a movement determination circuit which determines whether or not the subject or the imaging apparatus is moving,
   wherein the control circuit changes a frame rate of the image pickup device from a first frame rate to a second frame rate higher than the first frame rate when the movement determination circuit determines that the subject or the imaging apparatus is moving,
   wherein the control circuit sets a threshold for a detection of a peak of the evaluation value such that the detection of the peak is more difficult, in accordance with the change of the frame rate to the second frame rate, and
   wherein it is determined that an appropriate peak was detected when the evaluation value is detected as a peak and a difference between the evaluation value of the peak and an evaluation value at a position of the focus lens after the evaluation value of the peak is greater than the threshold.

2. The imaging apparatus according to claim 1, wherein the control circuit changes a threshold to decide a determination of a direction in which an in-focus position exists to a threshold at which the decision of the determination is more difficult, in accordance with the change of the frame rate to the second frame rate, and
   wherein the control circuit determines, when the evaluation value increases and the difference between the evaluation values exceeds the threshold, that a movement direction is a direction in which the in-focus position exists.

3. The imaging apparatus according to claim 1, wherein the control circuit changes the frame rate from the first frame rate to the second frame rate to continue acquisition of the evaluation value, and detects the peak of the evaluation value on the basis of an evaluation value generated from an imaging signal acquired at the first frame rate and an evaluation value generated from an imaging signal acquired at the second frame rate, when the movement determination circuit determines that the subject or the imaging apparatus is moving while the focus lens is being moved.

4. An imaging apparatus which moves a focus lens on the basis of an imaging signal of an image pickup device to perform a focal adjustment, the image pickup device imaging a subject, the imaging apparatus comprising:
   an evaluation value calculation circuit which extracts a predetermined signal component from the imaging signal to generate an evaluation value;
   a control circuit which performs the focal adjustment on the basis of the evaluation value; and
   a movement determination circuit which determines whether or not the subject or the imaging apparatus is moving,
   wherein the control circuit changes a frame rate of the image pickup device from a first frame rate to a second frame rate higher than the first frame rate when the movement determination circuit determines that the subject or the imaging apparatus is moving, wherein the control circuit changes to increase the number of lens positions used to calculate, by interpolation computation, a position of the focus lens corresponding to a peak of the evaluation value, in accordance with the change of the frame rate to the second frame rate.

5. An imaging apparatus which moves a focus lens on the basis of an imaging signal of an image pickup device to perform a focal adjustment, the image pickup device imaging a subject, the imaging apparatus comprising:
   an evaluation value calculation circuit which extracts a predetermined signal component from the imaging signal to generate an evaluation value;
   a control circuit which performs the focal adjustment on the basis of the evaluation value;
   a movement determination circuit which determines whether or not the subject or the imaging apparatus is moving; and
   a luminance detection circuit which detects a luminance of the subject on the basis of the imaging signal,
   wherein the control circuit changes a frame rate of the image pickup device from a first frame rate to a second frame rate higher than the first frame rate when the movement determination circuit determines that the subject or the imaging apparatus is moving, and
   wherein the control circuit does not change the frame rate of the image pickup device from the first frame rate to the second frame rate even though the movement determination circuit determines that the subject or the imaging apparatus is moving, when the luminance detected by the luminance detection circuit is less than or equal to a predetermined threshold.

6. An imaging method by an imaging apparatus which moves a focus lens on the basis of an imaging signal of an image pickup device to perform a focal adjustment, the image pickup device imaging a subject, the imaging method comprising:

determining whether or not the subject or the imaging apparatus is moving;

changing a frame rate of the image pickup device from a first frame rate to a second frame rate higher than the first frame rate when the subject or the imaging apparatus is determined to be moving;

extracting a predetermined signal component from the imaging signal to generate an evaluation value;

setting a threshold for a detection of a peak of the evaluation value such that the detection of the peak is more difficult, in accordance with the change of the frame rate to the second frame rate; and performing the focal adjustment on the basis of the evaluation value, wherein the performance of the focal adjustment includes determining that an appropriate peak was detected when the evaluation value is detected as a peak and a difference between the evaluation value of the peak and an evaluation value at a position of a focus lens after the evaluation value of the peak is greater than the threshold.

7. The imaging method according to claim 6, wherein changing the frame rate to the second frame rate comprises changing a threshold to decide a determination of a direction in which an in-focus position exists to a threshold at which the decision of the determination is more difficult, and wherein the performance of the focus adjustment includes determining that a movement direction is a direction in which the in-focus position exists when the evaluation value increases and the difference between the evaluation value exceeds the threshold.

8. The imaging method according to claim 6, wherein changing the frame rate to the second frame rate comprises changing to increase the number of lens positions used to calculate, by interpolation computation, a position of the focus lens corresponding to a peak of the evaluation value.

9. The imaging method according to claim 6, further comprising:

changing the frame rate from the first frame rate to the second frame rate to continue acquisition of the evaluation value when the subject or the imaging apparatus is determined to be moving while the focus lens is being moved; and detecting a peak of the evaluation value on the basis of an evaluation value generated from an imaging signal acquired at the first frame rate and an evaluation value generated from an imaging signal acquired at the second frame rate.

10. The imaging method according to claim 6, further comprising detecting a luminance of the subject on the basis of the imaging signal, wherein the frame rate of the image pickup device is not changed from the first frame rate to the second frame rate even though the subject or the imaging apparatus is determined to be moving, when the luminance is less than or equal to a predetermined threshold.

11. A computer-readable non-transitory storage medium storing an imaging program by an imaging apparatus which moves a focus lens on the basis of an imaging signal of an image pickup device to perform a focal adjustment, the image pickup device imaging a subject, the program comprising:

determining whether or not the subject or the imaging apparatus is moving;

changing a frame rate of the image pickup device from a first frame rate to a second frame rate higher than the first frame rate when the subject or the imaging apparatus is determined to be moving;

extracting a predetermined signal component from the imaging signal to generate an evaluation value;

setting a threshold for a detection of a peak of the evaluation value such that the detection of the peak is more difficult, in accordance with the change of the frame rate to the second frame rate; and performing the focal adjustment on the basis of the evaluation value, wherein the performance of the focal adjustment includes determining that an appropriate peak was detected when the evaluation value is detected as a peak and a difference between the evaluation value of the peak and an evaluation value at a position of a focus lens after the evaluation value of the peak is greater than the threshold.

12. The storage medium according to claim 11, wherein changing the frame rate to the second frame rate comprises changing a threshold to decide the determination of a direction in which an in-focus position exists to a threshold at which the decision of the determination is more difficult, and wherein the performance of the focus adjustment includes determining that a movement direction is a direction in which the in-focus position exists when the evaluation value increases and the difference between the evaluation values exceeds the threshold.

13. The storage medium according to claim 11, wherein changing the frame rate to the second frame rate comprises changing to increase the number of lens positions used to calculate, by interpolation computation, a position of the focus lens corresponding to a peak of the evaluation value.

14. The storage medium according to claim 11, wherein the program further comprises:

changing the frame rate from the first frame rate to the second frame rate to continue acquisition of the evaluation value when the subject or the imaging apparatus is determined to be moving while the focus lens is being moved; and detecting a peak of the evaluation value on the basis of an evaluation value generated from an imaging signal acquired at the first frame rate and an evaluation value generated from an imaging signal acquired at the second frame rate.

15. The storage medium according to claim 11, wherein the program further comprises detecting a luminance of the subject on the basis of the imaging signal, and the frame rate of the image pickup device is not changed from the first frame rate to the second frame rate even though the subject or the imaging apparatus is determined to be moving, when the luminance is less than or equal to a predetermined threshold.

* * * * *